United States Patent Office 3,379,720
Patented Apr. 23, 1968

---

3,379,720
WATER-SOLUBLE POLYMERS AND PROCESS OF PREPARING
Albert R. Reid, Wilmington, Del., assignor to Hercules Incorporated, a corporation of Delaware
No Drawing. Filed Oct. 12, 1964, Ser. No. 403,343
18 Claims. (Cl. 260—232)

The present invention relates to modified polymers and process of preparing. More particularly the present invention relates to polymers having both hydroxyl groups and carboxyl groups and which are water soluble but which can be insolubilized merely by curing.

The present invention includes polymers in any physical form, e.g. particulate particles or shaped objects, but for the sake of simplicity and ease of understanding the invention will be described hereinafter for the most part with reference to films.

The term "starch" is used herein to include amylaceous materials in general, i.e. starch in the more common sense derived from any source (e.g. starch derived from wheat, corn, sorghum, potato, tapioca, waxy maize), as well as amylose or amylopectin alone or any combination of amylose and amylopectin.

There are a number of commercial applications wherein it is desirable to lay down a deposit, coating, or film and the like from an aqueous solution of a polymer, and obtain a deposit, coating, or film and the like which upon curing is substantially water insoluble and has good wet strength. In a number of these applications it is also desirable that the film be soluble in some relatively inexpensive solvent since it is necessary in these applications to remove the film after it has served its purpose. The polymeric products of the present invention meet this condition well since they are readily soluble in dilute aqueous alkali (e.g. NaOH) solutions. Heretofore, attempts to prepare compositions having these desirable characteristics have not been as successful as desired. In the first place no one has been able to insolubilize prior art water-soluble polymers having both hydroxyl groups and carboxyl groups merely by curing; these polymers remain water soluble even after prolonged heating, and films cast from their aqueous solutions and dried have little if any wet strength.

The term "curing" is used herein in its usual sense in this art and includes subjecting aqueous solutions of polymers modified in accordance with the present invention in any form of article to any drying conditions either in the presence or absence of applied heat, at atmospheric or subatmospheric pressure, and such treatment may extends to any substantial amount of drying or to beyond the completion of drying.

Prior art methods for insolubilizing water-soluble polymers include (1) casting films from an aqeuous solution of the polymer and cross-linking agent and cross-linking by curing, the cross-linking agents including such materials as urea-formaldehyde, melamine-formaldehyde, resorcinol-formaldehyde, glyoxal, unsaturated diabisic acids, and chromium compounds, (2) acidifying a dilute aqueous solution of the polymer and casting films therefrom, soaking the films in strong acidic aqueous solutions, washing the films with dilute acidic aqueous solutions, water washing the films to remove salts and excess acid, and finally curing the films, (3) casting films from an aqueous solution of the polymer and surface insolubilizing the film by treating with aluminum sulfate or other similar insolubilizing agent, or with a strong acid, (4) replacing the salts ions (e.g. alkali metal cations) with hydrogen ions by passing a dilute solution of the polymer through an ion exchange column, casting films therefrom and curing the films.

All of the above prior art methods require steps in addition to curing, and most of these methods are also complicated and/or expensive. Methods (1) and (3) above give contaminated products (e.g. films) which seriously restrict their uses, and method (3) films disintegrate rapidly in water due to nonuniform insolubilization. The number of steps involved in method (2) detract from its commercial value. Method (4) is quite complicated and expensive.

From the foregoing it is obvious that it would be highly desirable to have polymers which are substantially water soluble and yet which can be rendered substantially water insoluble merely by curing.

It has been found in accordance with the present invention that polymers can be prepared which have the very desirable property of being water soluble and yet which can be insolubilized merely by curing. The polymers must contain both carboxyl groups and hydroxyl groups. A portion of the carboxyl groups must be in the free acid form and the remaining portion thereof must be in the salt form. The ratio of carboxyl groups in the free acid form to the carboxyl groups in the salt form must be within a critical range. Thus a deposit, coating, film, or the like can be laid down from an aqueous solution of said polymers which merely by curing can be converted to a water-insoluble deposit, coating, film, or the like of high wet strength.

As pointed out hereinbefore, the present invention is applicable to making water-soluble polymeric products capable of being rendered water insoluble merely by curing, irrespective of the physical form of the polymeric products. The term "films" used herein is intended to include all products embodied in a deposit, coating, film, and the like.

The following examples illustrate specific embodiments of the present invention but they are not intended to limit the scope of the present invention other than as defined in the appended claims. In these examples the following procedure was used.

The material to be treated was slurried in an inert medium therefor (about 50 ml. medium per gram of material to be treated was used in most cases but 20 ml.–60 ml. medium per gram of material to be treated also gave good results; the only requirement is that the slurry be readily stirrable) in order to uniformly incorporate the medium in the material to be treated. While continuing to stir, the material to be treated was acidified (by dropwise addition of acid) to the desired pH, i.e. the salt ions on some of the carboxyl groups were replaced with hydrogen ions in order to obtain the desired ratio of carboxyl groups in the free acid form to carboxyl groups in the salt form. Except as otherwise shown, 70% nitric acid was used to acidify. After completion of the addition of acid the acidified material was held at the reduced pH for one hour while continuing to stir. Then excess liquid was filtered from the acidified material after which it was washed and filtered to remove excess acid and then dried in vacuo for 1 hour at 60° C. After acidification excess liquid was drained off and the material was washed, usually to a pH of about 6 to 7.5. After washing, excess liquid was filtered to a solids content of about 50%–60% in each case. In each example the modified polymeric products were compared with the polymeric starting material (i.e. the unmodified polymer) by casting films from 2% aqueous solutions thereof, air drying and curing the films at elevated temperature in vacuo, except as otherwise indicated, then measuring the degree of insolubilization and wet strength thereof. The thickness of the films when wet was about 100 mils and when dry about 1.5 mils. In each example the wet strength of the films cast from the modified polymer was satisfactorily high for all practical purposes, whereas the wet strength of the films cast from the same but unmodified polymer was substantially zero. For instance, the wet tensile strength (lb./in.$^2$) of the film in Example 1 cast from unmodified CMC was zero, whereas the wet tensile strength of the film in Example 2 cast from CMC modified in accordance with the present invention was 640. The degree of insolubilization of the films made from modified and unmodified polymers, together with other detail conditions and results, are given in Tables 1–5 hereinafter.

The foregoing examples illustrate various specific ways of carrying out the present invention, however one may operate outside the conditions of these examples and within the scope of the present invention defined in the appended claims.

A number of conditions of the process of the present invention are important. These conditions will now be defined. The starting polymers and also the polymeric

TABLE 1

| Example No. | Polymer | Slurry Medium | Acidified to pH | Wash Medium | DS —COOH | DS —COONa | Ratio —COOH/ —COONa | Percent Water Insolubility of Cured Films |
|---|---|---|---|---|---|---|---|---|
| 1 | CMC | Control | | | | 0.44 | | Zero |
| 2 | CMC | 70% IPA | 6.0 | 70% IPA, 90% IPA, 95% MeOH | 0.03 | 0.41 | 0.07 | 10 |
| 3 | CMC | 70% IPA | 5.5 | 70% IPA, 90% IPA, 95% MeOH | 0.06 | 0.38 | 0.16 | 70 |
| 4 | CMC | 70% IPA | 4.5 | 70% IPA, 90% IPA, 95% MeOH | 0.15 | 0.29 | 0.52 | 84 |
| 5 | CMC | 70% IPA | 4.0 | 70% IPA, 90% IPA, 95% MeOH | 0.23 | 0.21 | 1.1 | 90 |
| 6 | CMC | Control | | | | 0.84 | | Zero |
| 7 | CMC | 70% MeOH | [1] 5.0 | 70% MeOH, 90% MeOH, 95% MeOH | 0.10 | 0.74 | 0.16 | 98 |
| 8 | CMC | 95% IPA | [1] 3.6 | 95% IPA | 0.31 | 0.53 | 0.59 | 96 |
| 9 | CMC | 95% IPA | [1] 1.1 | 95% IPA | 0.45 | 0.39 | 1.16 | 98 |

[1] 37% HCl used instead of 70% HNO$_3$.

TABLE 2

| Example No. | Polymer | Slurry Medium | Acidified to pH | Wash Medium | DS —COOH | DS —COONa | Ratio —COOH/ —COONa | Percent Water Insolubility of Cured Films |
|---|---|---|---|---|---|---|---|---|
| 10 | CMC | Control | | | | 0.87 | | Zero |
| 11 | CMC | 70% IPA | 4.5 | 70% IPA, 90% IPA, 95% MeOH | 0.20 | 0.67 | 0.30 | 68 |
| 12 | CMC | 70% IPA | 4.0 | 70% IPA, 90% IPA, 95% MeOH | 0.34 | 0.53 | 0.6 | 72 |
| 13 | CMC | 70% IPA | 3.0 | 70% IPA, 90% IPA, 95% MeOH | 0.63 | 0.24 | 2.6 | 94 |
| 14 | CMC | Control | | | | 1.19 | | Zero |
| 15 | CMC | 90% IPA | 3.5 | 90% IPA, 95% MeOH | 0.32 | 0.87 | 0.37 | 60 |
| 16 | CMC | 90% IPA | 3.0 | 90% IPA, 95% MeOH | 0.47 | 0.72 | 0.66 | 76 |
| 17 | CMC | 90% IPA | 1.5 | 90% IPA, 95% MeOH | 0.75 | 0.44 | 1.7 | 93 |

TABLE 3

| Ex. No. | Polymer | Slurry Medium | Acidified to pH | Wash Medium | DS —COOH | DS —COONa | Ratio —COOH/ —COONa | Percent Water Insolubility of Cured Films |
|---|---|---|---|---|---|---|---|---|
| 18 | CMS | Control | | | | 0.35 | | 2 |
| 19 | CMS | 85% MeOH | 4.0 | 85% MeOH, 70% MeOH, 95% MeOH | 0.03 | 0.32 | 0.09 | 65 |
| 20 | CMS | 85% MeOH | 3.0 | 85% MeOH, 70% MeOH, 95% MeOH | 0.11 | 0.24 | 0.46 | 95 |
| 21 | Sodium Alginate | Control | | | | 0.87 | | Zero |
| 22 | do | 70% IPA | 2.5 | 70% IPA, 90% IPA, 95% MeOH | 0.38 | 0.49 | 0.78 | 2 |
| 23 | do | 70% IPA | 2.0 | 70% IPA, 95% IPA | 0.57 | 0.30 | 1.90 | 63 |

TABLE 4

| Ex. No. | Polymer Name | HP MS | CM DS | Slurry Medium | Acidified to pH | Wash Medium | DS —COOH | DS —COONa | Ratio —COOH/ —COONa | Percent Water Insolubility of Cured Films |
|---|---|---|---|---|---|---|---|---|---|---|
| 24 | HPCMC | 0.15 | 0.82 | Control | | | | 0.82 | | Zero |
| 25 | HPCMC | 0.15 | 0.82 | 95% IPA | 5.0 | 95% IPA | 0.14 | 0.68 | 0.21 | 8 |
| 26 | HPCMC | 0.15 | 0.82 | 95% IPA | 4.5 | 95% IPA | 0.21 | 0.61 | 0.35 | 24 |
| 27 | HPCMC | 0.15 | 0.82 | 95% IPA | 4.0 | 95% IPA | 0.28 | 0.54 | 0.52 | 75 |
| 28 | HPCMC | 0.15 | 0.82 | 95% IPA | 3.5 | 95% IPA | 0.33 | 0.49 | 0.68 | 95 |
| 29 | HPCMC | 0.15 | 0.82 | 95% IPA | 3.0 | 95% IPA | 0.44 | 0.38 | 1.16 | 100 |
| 30 | CMC | | 0.86 | Control | | | | 0.86 | | Zero |
| 31 | HPCMC | 0.25 | 0.86 | 95% IPA | 3.0 | 95% IPA | 0.27 | 0.59 | 0.46 | 80 |
| 32 | HPCMC | 0.50 | 0.86 | 95% IPA | 1.5 | 95% IPA | 0.59 | 0.27 | 2.2 | 96 |

TABLE 5

| Ex. No. | Polymer Name | HP MS | CM DS | Slurry Medium | Acidified to pH | Wash Medium | DS —COOH | DS —COONa | Ratio —COOH/ —COONa | Percent Water Insolubility of Cured Films |
|---|---|---|---|---|---|---|---|---|---|---|
| 33 | HPCMC | 3.3 | 0.72 | Control | | | | 0.72 | | Zero |
| 34 | HPCMC | 3.3 | 0.72 | 98% Acetone | 3.0 | None | 0.44 | 0.28 | 1.6 | [1] 98 |
| 35 | HPC | 3.8 | | Control | | | | 0.19 | | Zero |
| 36 | Suc.[2] HPC | 3.8 | [3] 0.19 | [4] | 3.0 | [5] | 0.12 | 0.07 | 1.7 | 88 |
| 37 | CMC | | | Control | | | | 0.84 | | Zero |
| 38 | CMC | | | 95% IPA | 3.75 | 70% IPA, 95% IPA | 0.20 | 0.64 | 0.31 | 95 |
| 39 | CMC | | | 95% IPA | 3.75 | 70% IPA, 95% IPA | 0.20 | 0.64 | 0.31 | [6] 81 |

[1] 69% water insoluble when air dried for about 8 days at room temperature.
[2] Succinyl.
[3] Succinyl D.S.
[4] 1 part heptane, 5 parts 95% acetone by volume.
[5] First wash in 10 parts heptane, 25 parts 95% acetone and 1 part water by volume, then steep in 1 part heptane and 1 part acetone by volume.
[6] Cured by subjecting to 160° C. infrared heat in air for 5 minutes instead of 105° C. in vacuo for 60 minutes.

products resulting after treatment of said polymers in accordance with the present invention must contain both carboxyl groups and hydroxyl groups. In the polymeric products some of the carboxyl groups must be in the free acid form and the remainder in the salt form, and the ratio of carboxyl groups in the free acid form to the carboxyl groups in the salt form must be within the range of about 0.07/1–3/1. Operating within this ratio range is necessary not only to render the modified polymers insolubilizable to the desired extent merely by curing but also in order that the modified polymers will be sufficiently water soluble prior to curing. If this ratio is too low, the modified polymers are not capable of being insolubilized merely by curing. If this ratio is too high, the modified polymers are not sufficiently water soluble prior to curing. For many applications operating within the ratio range of about 0.2/1–2/1 is quite satisfactory. This ratio range is dependent primarily on the particular polymer being modified. For any given polymer the ratio varies with the particular inert medium used, pH to which acidified, and the time the polymer is held at the reduced pH. The present invention is intended to include modifying any polymer, by the process herein defined, to any degree which will leave the polymer sufficiently soluble in water but capable of being rendered more insoluble in water merely by curing. The polymers to be modified may be completely or partially soluble in water and the modified polymers after curing may be partially or completely insoluble in water; provided, however, that the modified polymers after curing are substantially more water insoluble than were said modified polymers prior to curing. The foregoing examples demonstrate operating within the scope of the present invention wherein the water insolubility of films cured from unmodified polymers was zero and the water insolubility of the films cured from modified polymers ranged from 2%–100%. Although it is in no way intended to limit the scope of the present invention, for many uses it is satisfactory if the water solubility of the modified polymers prior to curing is about 70% or above and the water insolubility of the modified polymers after curing is about 30% or above.

The conditions for drying the modified polymers (i.e. prior to curing) are not critical but must be given consideration, as anyone skilled in this art will appreciate. These conditions depend largely on the ratio of carboxyl groups in the free acid form to the carboxyl groups in the salt form. At higher ratios one should use milder conditions than at lower ratios. For instance good results are obtained by drying in vacuo at about 60° C. or by drying in air at about room temperature to 70° C. Also drying may be effected without application of heat if the additional drying time can be tolerated.

The conditions for curing the modified polymers (i.e. insolubilizing them after drying) will depend on a number of things including the degree of insolubilization desired and on the ratio of carboxyl groups in the free acid form to the carboxyl groups in the salt form. Good results (i.e. substantial insolubilization) have been obtained within the broad range of about room temperature for about 10–30 days to about 200° C. for about 1–2 minutes. In general the following approximate temperature-time conditions give satisfactory results: room temperature for 10–30 days, 90° C. for 120–180 minutes, 100° C.–110° C. for 60 minutes, 150° C. for 3–5 minutes, 200° C. for 1–2 minutes.

Starting polymers applicable in the present invention include those having both carboxyl groups and hydroxyl groups and which are soluble in water to a substantial extent. These include, e.g., polysaccharide polymers for instance starch and natural gums and ethers and esters of cellulose, starch, and natural gums. Natural gums applicable include, e.g., gum arabic, gum tragacanth, karaya gum, cacao gum, sapote gum, cholla gum, psyllium seed gum, fruit gums, mesquite gum, dawson gum, flax seed, plantago lanceolata, alkali metal salts of alginic acid and pectic acid. Said ethers applicable include, e.g., those having one or more of the substituent groups comprising carboxyalkyl, carboxyalkyl hydroxyalkyl, alkyl carboxyalkyl. Said esters applicable include, e.g., the half esters of dibasic acids examples of which are glutaric, succinic, adipic, phthalic.

The inert media and acidifying agent used are not critical and a large number are applicable. Preferably the inert medium will contain some water to aid ionization during acidification and also to aid in following the pH measurement. Aqueous alcohols and aqueous ketones have given good results. Preferably the acidifying agent will be a strong acid (either inorganic or organic), e.g. nitric acid, hydrochloric acid, sulfuric acid, although sulfuric acid is less desirable, formic acid, oxalic acid, citric acid. The acidifying agent will be one which ionizes more than the carboxyl groups in the polysaccharide being modified.

The purpose of the following paragraph is to explain the use herein and in the prior art of the terms "degree of substitution" ("D.S.") and "M.S."

There are three hydroxyl groups in each anhydroglucose unit in the cellulose molecule. D.S. is the average number of hydroxyl groups substituted in the cellulose per anhydroglucose unit. M.S. is the average number of moles of reactant combined with the cellulose per anhydroglucose unit. For the alkyl, carboxylalkyl, or acyl derivatives of cellulose, the D.S. and M.S. are the same. For the hydroxyalkyl derivatives of cellulose, the M.S. is generally greater than the D.S. The reason for this is that each time a hydroxyalkyl group is introduced into the cellulose molecule, an additional hydroxyl group is formed which itself is capable of hydroxyalkylation. As a result of this, side chains of considerable length may form on the cellulose molecule. The M.S./D.S. ratio represents the average length of these side chains. Thus, from the foregoing it will be seen that the D.S. of a cellulose derivative can be no higher than 3, whereas the M.S. may be considerably higher than 3, depending on the extent to which side chains are formed.

The following abbreviations have been used herein: CMC is carboxymethylcellulose, CMS is carboxymethyl starch, HPC is hydroxypropyl cellulose, HPCMC is hydroxypropyl carboxymethyl cellulose, HP is hydroxypropyl, CM is carboxymethyl, IPA is isopropyl alcohol.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. Process of preparing modified polysaccharides selected from the group consisting of starch, natural gums and ethers and esters of cellulose, starch and natural gums having both hydroxyl and carboxyl groups which comprises slurrying water-soluble polysaccharide in an inert medium, acidifying said polysaccharide until the ratio range of the free acid form to the salt form of its carboxyl groups is about 0.07/1–3/1, removing excess acid from the acidified polysaccharide and drying same, the resulting modified polysaccharide being water soluble and yet capable of being insolubilized merely by curing.

2. Process of claim 1 wherein said ratio range is about 0.2/1–2/1.

3. Process of claim 1 wherein the polysaccharide being slurried is a material selected from the group consisting of ethers and esters of cellulose, natural gums, and starch.

4. Process of claim 3 wherein the polysaccharide being slurried is a cellulose ether.

5. Process of claim 4 wherein the cellulose ether is a carboxyalkyl cellulose ether.

6. Process of claim 5 wherein the carboxyalkyl cellulose ether is carboxymethylcellulose.

7. Process of claim 4 wherein the cellulose ether is a carboxyalkyl hydroxyalkyl cellulose ether.

8. Process of claim 7 wherein the cellulose ether is carboxymethyl hydroxyethyl cellulose.

9. Process of claim 7 wherein the cellulose ether is carboxymethyl hydroxypropyl cellulose.

10. Process of claim 3 wherein the polysaccharide being slurried is a starch ether.

11. Process of claim 10 wherein the starch ether is carboxymethyl starch.

12. Process of claim 3 wherein the polysaccharide being slurried is a cellulose ester.

13. Process of claim 12 wherein the cellulose ester is a half ester of a dibasic aliphatic acid.

14. Process of claim 13 wherein the cellulose ester is cellulose succinate.

15. Process of claim 12 wherein the cellulose ester is succinylated hydroxyalkyl cellulose.

16. Process of claim 12 wherein the cellulose ester is succinylated carboxyalkyl cellulose.

17. Polysaccharides selected from the group consisting of starch, natural gums and ethers and esters of cellulose, starch and natural gums having both hydroxyl and carboxyl groups, a portion of the carboxyl groups being in the free acid form and the remainder of the carboxyl groups being in the salt form such that the ratio range of the free acid form to salt form of the carboxyl groups is about 0.07/1–3/1, said polysaccharides being water soluble and yet capable of being insolubilized merely by curing.

18. Product of claim 17 wherein said ratio range is about 0.2/1–2/1.

References Cited
UNITED STATES PATENTS

| | | | |
|---|---|---|---|
| 3,017,237 | 1/1962 | Bullock et al. | 260—231 |
| 2,766,137 | 10/1956 | Ashton et al. | 260—231 |

DONALD E. CZAJA, *Primary Examiner.*

LEON J. BERCOVITZ, *Examiner.*

R. W. MULCAHY, *Assistant Examiner.*